United States Patent [19]

Rasmussen

[11] Patent Number: 4,485,653
[45] Date of Patent: Dec. 4, 1984

[54] HYDRAULIC CHUCK FOR THREADED TUBE

[75] Inventor: Robert Rasmussen, Minneapolis, Minn.

[73] Assignee: Air-Mo Hydraulics Inc., Minneapolis, Minn.

[21] Appl. No.: 460,468

[22] Filed: Jan. 24, 1983

[51] Int. Cl.³ .............................................. B21D 39/08
[52] U.S. Cl. ........................................ 72/58; 279/4; 279/99; 285/18
[58] Field of Search ................... 72/58, 61, 62; 29/421 R; 279/4, 99; 285/18, 355

[56] References Cited

U.S. PATENT DOCUMENTS

| | | | |
|---|---|---|---|
| 3,442,106 | 5/1969 | Gray et al. | 72/58 |
| 3,962,769 | 6/1976 | Smida | 279/4 X |
| 4,142,739 | 3/1979 | Billingsley | 285/18 |
| 4,393,674 | 7/1983 | Rasmussen | 29/421 R X |
| 4,432,559 | 2/1984 | Rasmussen | 279/4 |
| 4,432,569 | 2/1984 | Wietecha | 285/18 |

Primary Examiner—William R. Briggs
Assistant Examiner—Lawrence H. Meier
Attorney, Agent, or Firm—John S. Munday

[57] ABSTRACT

A threaded coupling chuck device for use with a male threaded tube, including a body, a shaft for rotation, a sleeve and adaptor, nose cone, seal means, port means and a valve.

The body is centered about an axis and has a sleeve rotably mounted inside the body. This sleeve is driven by the shaft means which rotates the sleeve in a first direction for coupling with the tube and the other direction to uncouple.

Fixedly mounted in the sleeve is an adaptor means which has a nose cone supported on it. The nose cone has a threaded portion for forming a coupling with the male threaded tube upon rotation of the shaft in the first direction. The nose cone may also have a tapered surface adjacent the threaded portion to guide the tube into coupling contact with the threads.

Seal means are provided generally at all junctions, and particularly for preventing passage of fluid between the tube and the nose cone coupling. The seal means includes means to activate the seal and pneumatic means for urging the seal against the tube threads in the coupling. The seal means may have a threaded annular portion positioned along the threaded portion of the nose cone which is adapted to expand to contact the tube via activation of the pneumatic means. Biasing means may also be provided to maintain the seal in an inactive or non-contacting position until activation to overcome the biasing means. Porting means may be provided to allow detecting means for identifying leaks from said expandable seal.

Port means for defining a passage through the body are provided, including an inlet for connection to a source of fluid and an outlet through the adaptor means to the interior of the tube.

Finally, valve means are positioned in the passage and are moveable from a first position to permit flow of fluid in the passage and a second position to prevent fluid flow. In one embodiment, the valve includes a pneumatically operated piston to move the poppet and cap from open to closed.

9 Claims, 1 Drawing Figure

HYDRAULIC CHUCK FOR THREADED TUBE

BACKGROUND OF THE INVENTION

Fluid pressure operated devices for radially expanding portions of or testing tubing are known, such devices being disclosed in U.S. Pat. Nos. 1,448,457; 2,479,702; 2,938,562; and 3,200,627. Structures of these patents include fluid conveying mandrels receivable within the tubes, means for expanding the mandrels to hold the tubing, and die elements against which portions of the tubes are flared or otherwise formed by fluid pressure. These expanding devices are customarily used to provide shaped bulges in tubing for coupling purposes and the like. In addition, they are used to expand tubing to fit fins and other apparatus connected to the outer surface of the tubing.

Several hydraulic chucks have been developed which are suitable for tightly gripping one end of the elongated tube while simultaneously delivering a tube expanding or testing fluid. Among these are U.S. Pat. Nos. 3,505,846; 3,813,751; 3,962,769; and 4,189,162.

One of the problems which has plagued users of hydraulic chucks is the inability of such previously described chucks to fasten operably to the ends of the tubes without damaging the tube, particularly where the tube end is threaded for connection to other equipment. Threaded tubes are particularly susceptable to damage, which then involves costly repair.

One method which obviates damage to the threads is to design the chuck so that it can be threaded into or onto the tube. Because several revolutions of the chuck are required, it is often times necessary to disconnect the chuck from pneumatic or hydraulic sources. More important, seals must be provided which can withstand the high hydraulic pressure which is applied to the tube through the chuck.

Hydraulic chucks should be designed to be used with a vast multitude of tubes, and should not require repair or servicing for long periods of time. Yet often times the seals which may be provided often times are damaged by contact with the tube or tube threads, or the seals wear out from use. It is expected that seals will, in time, need replacement. Replacement should not be a major engineering effort, nor should it be necessary to worry about seal alignment or wear during installation.

Accordingly, it would be of great advantage if a hydraulic chuck could be provided which would easily connect to threaded tubes, and particularly male threaded tubes, and which would permit quick and damage free connection to the tube. The device must be capable of mounting or connecting on the tube without constant disconnection of the hydraulic or pneumatic lines. Damage to the tube, and to the chuck and chuck seals should be minimal at most.

SUMMARY OF THE INVENTION

The present invention relates to a hydraulic chuck, comprising a plurality of parts in interworking relationship which accomplish the objects of the present invention. Specifically the invention comprises a hydraulic chuck for use with a male threaded tube.

The body with suitable mounting means is centered about an axis and has a sleeve rotably mounted inside the body. The sleeve is driven by a shaft which may be attached to a motor which rotates the interior portion of the device to couple and uncouple with the tube.

Mounted on the tube is an adaptor which supports on it a nose cone. The nose cone is sized to fit a desired tube size and may be replaced with other interchangeable nose cones of other sizes. The nose cone has a threaded portion for forming a coupling with the male threaded tube. It may also have a tapered surface adjacent the threaded portion to guide the tube into coupling contact with the threads.

Seal means are provided generally at all points where necessary. Particularly, a seal is provided for preventing passage of fluid between the tube and the nose cone at their coupling. Means to activate the seal are included, such as by pneumatic means for urging the seal against the tube threads in the coupling. Conduits and passageways may be provided to monitor any leakage due to wear on said seals in the nose cone. The seal may have a threaded annular portion positioned along the threaded portion of the nose cone, which is adapted to expand to contact the tube when compressed by action of the pneumatic means. Biasing means may be provided to maintain the seal in a position out of contact with the threaded portion until needed to prevent damage during coupling.

Port means are provided for defining a passage of fluid flow through the body from an inlet connected to a source of fluid to an outlet in the interior of the tube.

Valve means are positioned in the passage to permit flow in the passage when the valve is open and close off the passage when the tests are in operation or other reasons require no fluid flow.

DESCRIPTION OF THE DRAWINGS

For a more complete understanding of the invention, reference is hereby made to the drawing in which:

The FIGURE is a partially sectioned view showing the preferred embodiment of the present invention.

DETAILED DESCRIPTION OF THE INVENTION

Figure 1:
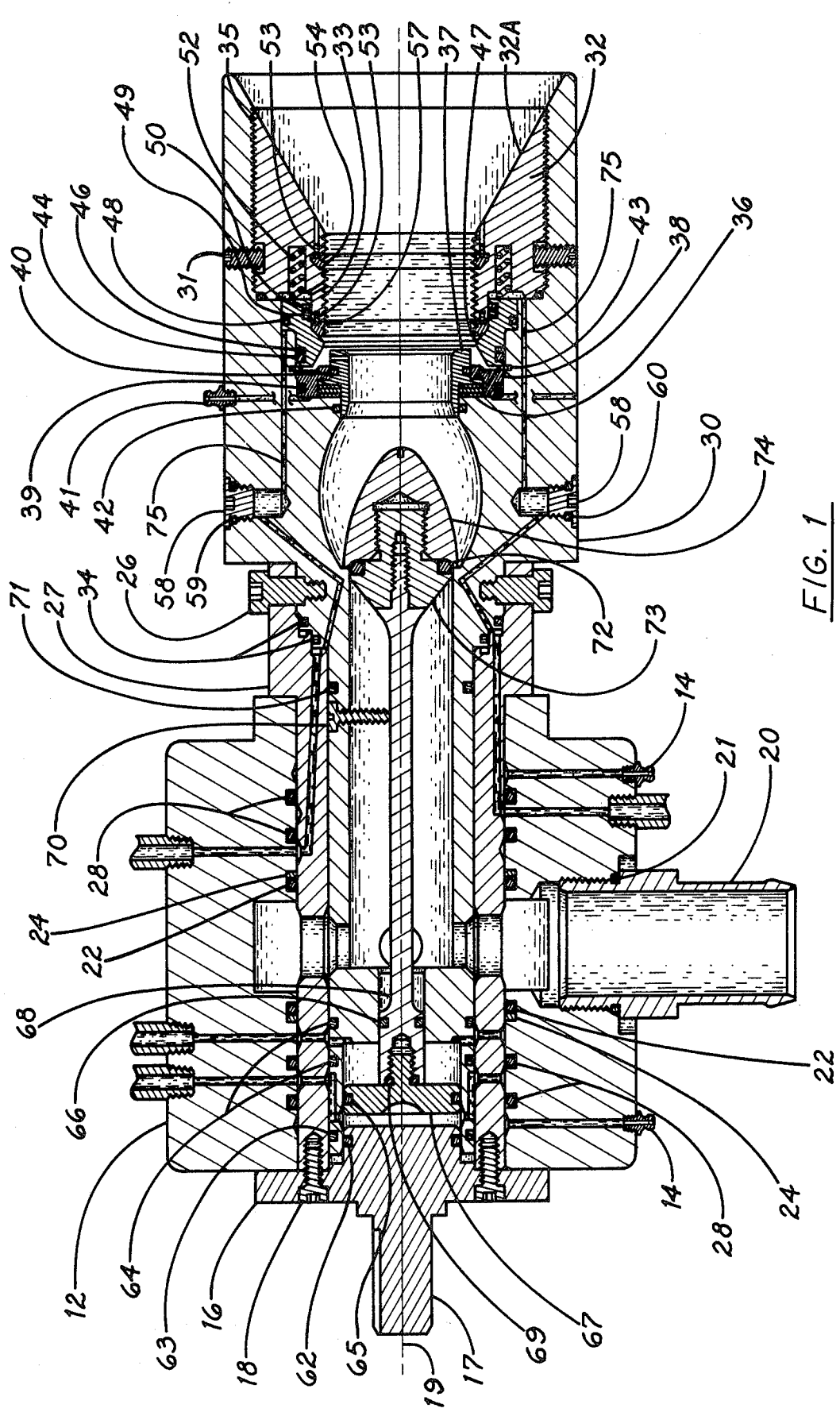

As shown in the FIGURE, the chuck device 10 is generally described. The chuck includes a body 12 which is fitted with lubrication fittings 14. Cap 16 and shaft 17 are positioned in the body 12 and centered about the axis of the body 12 for rotation of sleeve 27 and adaptor 30 about that axis. Cap screws 18 mount the cap 16 to the sleeve 27.

Hose fitting 20 is threaded into body 12 with o-ring seal 21 to form an inlet for the port means on the body 12, wherein a passage to the interior of the body 12 is defined. O-rings 22 and backup rings 24 seal the passage from leakage between body 12 and sleeve 27.

Shoulder bolt 26 attaches sleeve 27 to adaptor 30. Supported by adaptor 30 is nose cone 32, attached by a plurality of set screws 31 radially around cone 32. Cone 32 can then be threaded onto adaptor 30 via threads 35 for replacement for different sizes or repair.

The nose cone 32 has threads 33 in suitable position for engagement with the tube, so as to form a threaded coupling. Cone 32 has a tapered portion 32a which permits easy location of the tube with the threads 33.

As the tube engages threads 33, when shaft 17 is rotated in a first direction, it will eventually abut against thrust bearing assembly 36 at bearing face 37. The bearing assembly 36 is sealed by o-ring seals 39, 40 and 42 to prevent fluid leakage. When shaft 17 is rotated in the other direction, face 37 moveably permits the tube to be uncoupled without restriction from contact between the chuck and tube. Lubrication fitting 41 keeps bearing assembly 36 in good operating condition.

Separated from the bearing retainer 38 (which holds the bearing assembly 36 in position) by snap ring 43 is seal operator 47, which is sealed from the bearing retainer 38 and other parts by o-ring seal 44 with backup ring 46 and o-ring seals 48 and 49, with backup ring 50. The seal operator 47 is held in a first position with biasing spring 52. Index pin 53 holds first seal 54 and seal 57 in position. Both seals 54 and seal 57 may be annular rubber seals, threaded if desired to match threads 33, and provided with a plurality of axially oriented indexing pins that maintain the proper synchronism between the threads on the seal rings and those in said nose cone, which can readily be replaced when cone 32 is removed.

Seal operator 47 is activated by pneumatic pressure between o-ring seals 44 and 48 to squeeze tapered seal 57 against the thread coupling and overcome spring 52. Release of the pressure will allow seal 57 to relax away from the threaded mating surface.

Plugs 58 are provided with o-ring seals 59 and 60 to permit interconnecting conduits to be drilled in adaptor 30.

O-ring seals 62, 63, 64, 65 and 66 seal and isolate air piston 67, which is attached to valve stem 68 past o-ring seal 69. Stem 68 is positioned by valve guide 70, with o-ring seals 71 and 72 isolating valve guide 70 and valve poppet 73. Valve cap 74 is carried on poppet 73, moved by stem 68.

Pneumatic pressure is provided through ports (shown dotted) to move air piston 67 from a first position where the valve is open permitting fluid to flow from inlet 20 into the tube, to a second or closed position. Cap 74 prevents flow of fluid through the passage.

In one operation of the chuck of this invention, it is used, for example by connecting it to the fill end of a hydrostatic test station. In such an operation, the threaded tube is inserted into nose cone 32, such that taper 32a permits engagement of the tube on threads 33. Rotation of shaft 17 via a motor, not shown, screws the chuck onto the tube as sleeve 27 rotates inside body 12. Bearing face 37 of thrust bearing 36 accepts the end of the tube, and could contain sensor means if the device is automated.

Seal operator 47 is then engaged as described to put seal 57 against the tube threads. Air pressure on the left side of air piston 67 opens check valve poppet 73 and cap 74, so that fluid can enter the body via hose fitting 20 and pass through the device to the tube. When the tube is filled, the air piston 67 is moved with air pressure on its right side, to move valve stem 68 and close the check valve. High pressure tests can then be carried out. The check valve can then be opened as described, the fluid drained and the chuck removed by reversing the motor.

Having thus described the invention, what is claimed is:

1. A threaded coupling chuck device for use with a male threaded tube, comprising:
   a chuck body mounted about an axis of rotation, and including a shaft means centered about said axis;
   sleeve means rotatably mounted inside said body and driven by said shaft means;
   adaptor means fixedly mounted on said sleeve and said shaft, and including supported thereon a nose cone, said nose cone having a threaded portion for forming a coupling with said tube upon rotation in a first direction about said axis;
   seal means for preventing passage of fluid through said coupling;
   port means for defining a passage through said adaptor and said body, including an inlet on said body for connection to a source of fluid and an outlet through said adaptor means to the interior of said tube; and
   valve means in said passage in said adaptor, including means for positioning said valve in a first position to permit flow of fluid through said passage and a second position to prevent fluid flow in said passage.

2. The device of claim 1 wherein said nose cone includes a tapered surface adjacent to the threaded portion to guide said tube into coupling contact with said device.

3. The device of claim 1 wherein said seal means includes means to activate said seal, including pneumatic means for urging said seal against said threaded portion in said coupling.

4. The device of claim 3 wherein said seal means includes a threaded annular portion positioned along the threaded portion of the nose cone, and adapted to expand to contact said tube upon activation of said pneumatic means.

5. The device of claim 1 which further includes biasing means operably connected to maintain said seal means in a nonactive position until said seal means is activated to overcome said biasing means.

6. The device of claim 1, which further includes thrust bearing means on said adaptor means positioned to contact the end of said tube upon rotation of said shaft in said first direction and permit movement of said thrust bearing means in the other direction about said axis without restriction from contact by said end of said tube.

7. The device of claim 1, wherein said valve means includes piston means slideably mounted on said adaptor means, said piston means having pneumatic means for moving said piston between the first and second position.

8. The device of claim 7, wherein said valve means additionally includes poppet and cap means, all of which are adapted to contact said adaptor in said second position to prevent flow of fluid in said passage.

9. A threaded coupling chuck device for use with a male threaded tube, comprising:
   a chuck body centered about an axis of rotation, and including shaft means centered about said axis;
   sleeve means rotatably mounted inside said body and driven by said shaft means;
   adaptor means fixedly mounted on said sleeve and said shaft, and including supported thereon a nose cone, said nose cone having a threaded portion for forming a coupling with said tube upon rotation in a first direction about said axis, said nose cone further including a tapered surface adjacent the threaded portion to guide said tube into coupling contact with said device;
   seal means for preventing passage of fluid through said coupling, said seal means including means to activate said seal and pneumatic means for urging said seal against said tube threads in said coupling, said seal means having a threaded annular portion positioned along the threaded portion of the nose cone, said seal means having a plurality of axially located pins that keep threads on seal properly oriented with threads on said nose cone, and being adapted to expand to contact said tube upon activation of said pneumatic means;

biasing means operably connected to said seal means to maintain said seal means in a nonactive position until said seal means is activated to overcome said biasing means;

port means for defining a passage through said adaptor and said body, including an inlet on said body for connection to a source of fluid and an outlet through said adaptor means to the interior of said tube;

thrust bearing means on said adaptor means positioned to contact the end of said tube upon rotation of said shaft in said first direction and permit movement of said axis without restriction from contact by said end of said tube; and valve means in said passage in said adaptor, including means for positioning said valve in a first position to permit flow of fluid through said passage and a second position to prevent fluid flow in said passage, said valve means and including pneumatic means for moving said piston between the first and second position, said valve means includes poppet and cap means adapted to contact said adaptor in said second position to prevent flow of fluid in said passage.

* * * * *